(12) United States Patent
Zhang et al.

(10) Patent No.: US 8,917,052 B2
(45) Date of Patent: Dec. 23, 2014

(54) SOLAR CELL CONNECTION MODULE

(75) Inventors: Zhenhua Zhang, Shanghai (CN); Xiaoqun Chen, Shanghai (CN); Chunfu Zhou, Shanghai (CN); Feng Wang, Shanghai (CN); Yong Wang, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 309 days.

(21) Appl. No.: 13/464,383

(22) Filed: May 4, 2012
(Under 37 CFR 1.47)

(65) Prior Publication Data
US 2013/0072039 A1 Mar. 21, 2013

(30) Foreign Application Priority Data

May 5, 2011 (CN) .......................... 2011 2 0147013

(51) Int. Cl.
*H01M 6/50* (2006.01)
*H02J 7/00* (2006.01)
*H01R 12/00* (2006.01)
*H05K 1/00* (2006.01)
*H01R 13/74* (2006.01)
*H01L 31/048* (2014.01)

(52) U.S. Cl.
CPC .................. *H01R 13/74* (2013.01); *Y02E 10/50* (2013.01); *H01L 31/0485* (2013.01)
USPC ......................................... 320/101; 439/76.1

(58) Field of Classification Search
USPC ......................................... 320/101; 439/76.1
See application file for complete search history.

(56) References Cited

U.S. PATENT DOCUMENTS

| | | | | | |
|---|---|---|---|---|---|
| 484,896 | A | * | 10/1892 | Kulage ........................... | 425/168 |
| 5,223,044 | A | * | 6/1993 | Asai ................................ | 136/255 |
| 5,513,075 | A | * | 4/1996 | Capper et al. .................. | 361/773 |
| 2008/0190477 | A1 | * | 8/2008 | Hattori ........................... | 136/246 |
| 2009/0283137 | A1 | * | 11/2009 | Croft et al. ..................... | 136/251 |
| 2011/0011641 | A1 | * | 1/2011 | Pfeffer ........................... | 174/547 |
| 2011/0031816 | A1 | * | 2/2011 | Buthker et al. ................. | 307/82 |
| 2011/0088752 | A1 | * | 4/2011 | Chen et al. ..................... | 136/246 |
| 2011/0192448 | A1 | * | 8/2011 | Croft et al. ..................... | 136/251 |
| 2011/0220168 | A1 | * | 9/2011 | Park ................................ | 136/244 |
| 2011/0226305 | A1 | * | 9/2011 | Chen et al. ..................... | 136/244 |
| 2012/0055529 | A1 | * | 3/2012 | Hung et al. .................... | 136/244 |
| 2012/0274389 | A1 | * | 11/2012 | Ger et al. ....................... | 327/504 |
| 2012/0318319 | A1 | * | 12/2012 | Pinarbasi et al. .............. | 136/244 |
| 2014/0076375 | A1 | * | 3/2014 | Park ................................ | 136/244 |
| 2014/0216523 | A1 | * | 8/2014 | Almogy et al. ................ | 136/246 |

* cited by examiner

Primary Examiner — Suresh Memula
(74) Attorney, Agent, or Firm — Barley Snyder

(57) ABSTRACT

A solar cell connection module that includes a solar cell, a first junction box, and a second junction box. The solar cell panel includes a negative electrode and a positive electrode. The first junction box includes a first conductor, a second conductor, a first cable electrically connected to the second conductor, and a diode electrically connected between the first and second conductors. The first conductor is electrically connected to the negative electrode and the second conductor is electrically connected to the positive electrode so that the diode is electrically connected in parallel with the solar cell panel. The second junction box includes a conductor piece electrically connecting to the negative electrode and a second cable electrically connected to the conductor piece.

28 Claims, 3 Drawing Sheets

SOLAR CELL CONNECTION MODULE

CROSS-REFERENCE TO RELATED APPLICATION

This application claims priority under 35 U.S.C. §119 to Chinese Patent Application No. 201120147013.3 filed on May 5, 2011.

FIELD OF THE INVENTION

The invention relates to a connection module and, more particularly, to a solar cell connection module for electrically connecting a plurality of solar cell panels.

BACKGROUND

It is generally known that a solar cell panel is configured to have only one junction box in which one or more diode is disposed. Furthermore, the diode of each junction box is electrically connected to the solar cell panel in a parallel connection manner and served as a by-pass diode. In addition, each junction box has two external cables for interconnecting a plurality of solar cell panels.

When it needs to interconnect the solar cell panels, one external cable for a first junction box of a first solar cell panel may be electrically connected to one external cable for a second junction box of a second solar cell panel, the other external cable for the first junction box of the first solar cell panel may be electrically connected to one external cable for a third junction box of a third solar cell panel. For realizing a quick interconnection and assembly of the solar cell panels in the field, for example, the external cables may be interconnected through connectors.

In the prior art, the junction box is configured to be electrically connected with the solar cell panel in only one connection mode where the diode functions as a by-pass diode. Accordingly, the diode only can protect the solar cell panel in a by-pass manner.

But, in certain applications, sometimes there is a need to protect the solar cell panel in an interrupting mode where the diode is electrically connected with the solar cell panel in series and functions as an interrupting diode. Therefore, it is necessary to design a different junction box specially used to protect the solar cell panel in an interrupting manner.

However, providing different solar cell connection modules to achieve different protection modes for the solar cell panel increases the cost.

SUMMARY

The invention has been made to overcome or alleviate at least one aspect of the above mentioned disadvantages.

The solar cell connection module is used for a solar cell having a negative electrode and a positive electrode, the solar cell connection module having a first junction box and a second junction box. The first junction box includes a first conductor, a second conductor, a first cable electrically connected to the second conductor, and a diode electrically connected between the first and second conductors. The first conductor is electrically connected to the negative electrode and the second conductor is electrically connected to the positive electrode so that the diode is electrically connected in parallel with the solar cell panel. The second junction box includes a conductor piece electrically connecting to the negative electrode and a second cable electrically connected to the conductor piece.

BRIEF DESCRIPTION OF THE DRAWINGS

The above and other features of the invention will become more apparent by describing in detail exemplary embodiments thereof with reference to the accompanying drawings, in which.

DETAILED DESCRIPTION OF THE EMBODIMENT(S)

Figure 1:
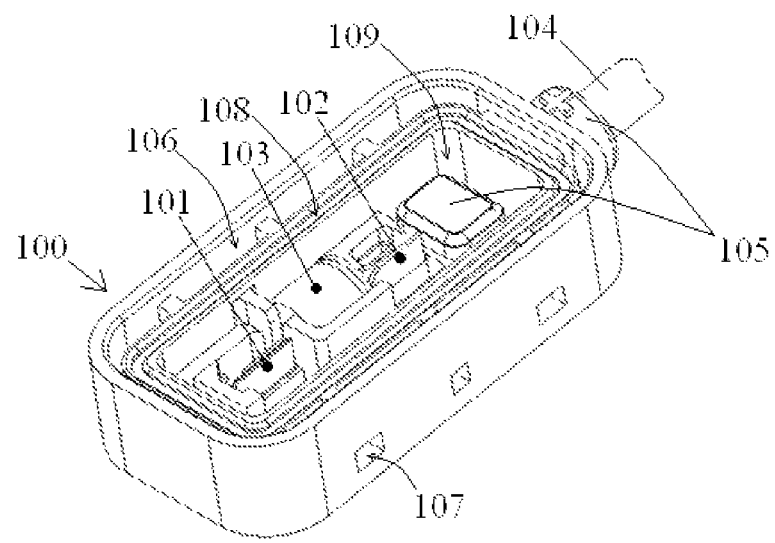
FIG. 1 is a perspective view showing a first junction box of a solar cell connection module according to the invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

With reference to FIG. 1, a first junction box 100 of a solar cell connection module according to the invention is shown, with a gel filling chamber 109 formed in a housing of the first junction box 100. A first conductor 101, a second conductor 102 and a diode 103 are received in the gel filling chamber 109. The diode 103 is electrically connected between the first and second conductors 101, 102 in series. That is, one end of the diode 103 is electrically connected to the first conductor 101, and another end is electrically connected to the second conductor 102.

In an exemplary embodiment, the first and second conductors 101, 102 each may be a metal conductive sheet that is adapted for electrically connecting with a bus bar of a solar cell panel.

Referring back to FIG. 1, the first junction box 100 has a first cable 104. One end of the first cable 104 extends into the gel filling chamber 109 of the first junction box 100 and is electrically connected to the second conductor 102. In this way, the first cable 104 is electrically connected with the second conductor 102, the diode 103 and the first conductor 101 in series.

The one end of the first cable 104 extending into the first junction box 100 is secured in the housing, for example, using overmolded members 105 formed on the housing of the first junction box 100. More specifically, as shown in FIG. 1, the overmolded members 105 are formed at a position where the first cable 104 is engaged to an outer wall of the housing of the first junction box 100 and at another position where the first cable 104 is electrically connected to the second conductor 102 within the first junction box 100, respectively. In this way, the first cable 104 is firmly secured in the housing by the above two overmolded members 105. Accordingly, the first cable 104 cannot be moved or released from the housing and the second conductor 102 even if a large external pulling force is exerted on the first cable 104, and the electrical connection of the first cable 104 to the second conductor 102 can be reliably maintained.

After the first conductor 101, the diode 103, the second conductor 102 and the first cable 104 have been mounted in the housing of the first junction box 100, the gel filling chamber 109 is filled with gel to seal and fix the first conductor 101, the diode 103, the second conductor 102 and a portion of the first cable 104 extending into the gel filling chamber 109 in the first junction box 100.

When gel is being poured into the gel filling chamber 209, it is possible for excessive gel to over flow. The excessive gel may overflow out of the gel filling chamber 209 and may further overflow out of the housing of the second junction box 200. In order to prevent the excessive gel from overflowing out of the housing of the first junction box 100, in the exemplary embodiment of FIG. 1, a first gel overflowing groove 108 is formed surrounding the first gel filling chamber 109 to receive an overflowed gel from the first gel filling chamber 109. In this way, the excessive gel overflowed from the first gel filling chamber 109 flows into the first gel overflowing groove 108, instead of flowing out of the housing of the first junction box 100.

Furthermore, in order to prevent water, dust and other contaminations from accumulating in the housing of the first junction box 100, in an exemplary embodiment of the invention, a first drainage groove 106 is formed surrounding a periphery of the first gel overflowing groove 108 in the housing of the first junction box 100, and at least one drainage port 107 is formed in the lower portion of the first drainage groove 106. In this way, when the water, dust and other contaminations enter into the housing of the first junction box 100, they will be gathered in the first drainage groove 106 and discharged out of the housing of the first junction box 100 in time without penetrating into the gel filling chamber 109.

Figure 2:
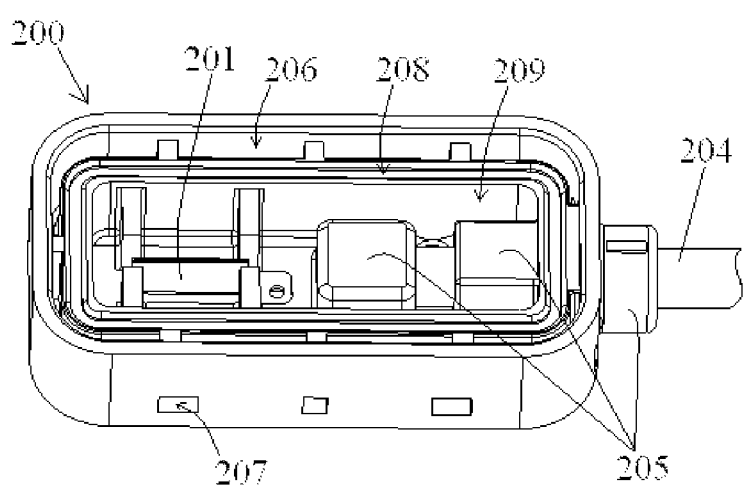
FIG. 2 is a perspective view showing a second junction box of a solar cell connection module according to the invention.

Now with reference to FIG. 2, a second junction box 200 of a solar cell connection module according to the invention is shown, with a gel filling chamber 209 formed in a housing of the second junction box 200. A conductor piece 201 is received in the gel filling chamber 209.

In an exemplary embodiment of the invention, the conductor piece 201 may be a metal conductive sheet that is adapted for being electrically connecting with a bus bar of a solar cell panel.

Please refer to FIG. 2, the second junction box 200 has a second cable 204. One end of the second cable 204 extends into the gel filling chamber 209 of the second junction box 200 and is electrically connected to the conductor piece 201. In this way, the second cable 204 is electrically connected with the conductor piece 201 in series.

Referring to FIG. 2, the one end of the second cable 204 extending into the second junction box 200 is fixed in the housing, for example, by means of over molding features 205 formed on the housing of the second junction box 200. More specifically, as shown in FIG. 2, the over molding features 205 are formed at a first position where the second cable 204 is engaged to an outer wall of the housing, at a second position where the second cable 204 is engaged to an inner wall of the housing, and at a third position where the second cable 204 is electrically connected to the conductor piece 201 within the second junction box 200, respectively. In this way, the second cable 204 is firmly secured in the housing using the over molding features 205 formed at the above three positions. Accordingly, the second cable 204 cannot be moved or released from the housing and the conductor piece 201 even if a large external pulling force is exerted on the second cable 204, and the electrical connection of the second cable 204 to the conductor piece 201 can be reliably maintained.

After the conductor piece 201 and the second cable 204 have been mounted in the housing of the second junction box 200, the gel filling chamber 209 is filled with gel to seal and fix the conductor piece 201 and a portion of the second cable 204 extending into the gel filling chamber 209 in the second junction box 200.

When gel is being poured into the gel filling chamber 209, it is possible for excessive gel to over flow. The excessive gel may overflow out of the gel filling chamber 209 and may further overflow out of the housing of the second junction box 200. In order to prevent the excessive gel from overflowing out of the housing of the second junction box 200, in the exemplary embodiment of FIG. 2, a second gel overflowing groove 208 is formed surrounding a periphery of the second gel filling chamber 209 to receive an overflowed gel from the second gel filling chamber 209. In this way, the excessive gel overflowed from the second gel filling chamber 209 flows into the second gel overflowing groove 208, instead of flowing out of the housing of the second junction box 200.

Furthermore, in order to prevent water, dust and other contaminations from being accumulated in the housing of the second junction box 200, in an exemplary embodiment of the invention, a second drainage groove 206 is formed surrounding the second gel overflowing groove 208 in the housing of the second junction box 200, and at least one drainage port 207 is formed in the lower portion of the second drainage groove 206. In this way, when the water, dust and other contaminations enter into the housing of the second junction box 200, they will be gathered in the second drainage groove 206 and discharged out of the housing of the second junction box 200 in time without penetrating into the gel filling chamber 209.

The first and second junction boxes 100, 200 of the solar cell connection module have been discussed in detail by referring to FIGS. 1-2. Hereafter, the operation of connecting the first and second junction boxes 100, 200 to the solar cell panel 300 in a by-pass diode connection mode and in an interrupting diode connection mode will be described with reference to FIGS. 3-4.

Figure 3:
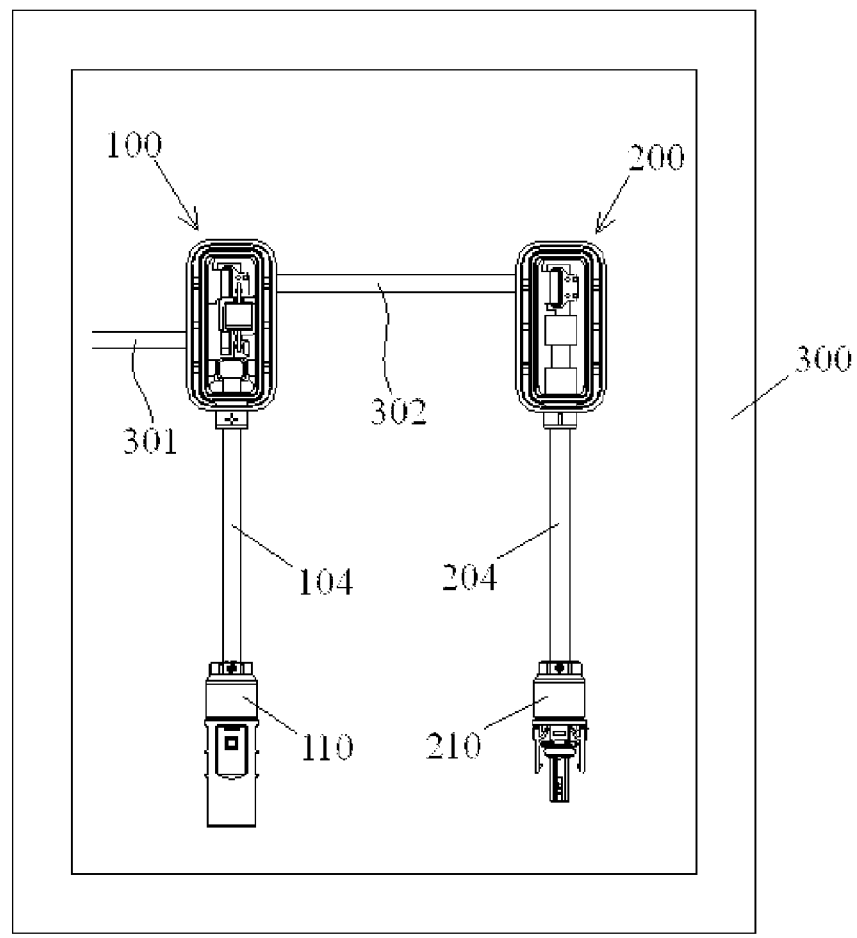
FIG. 3 is a plan view showing the first junction box of FIG. 1 and the second junction box of FIG. 2 connected with a solar cell panel in a by-pass protection mode.

As shown in FIGS. 1-3, in the by-pass diode connection mode, the first conductor 101 of the first junction box 100 is electrically connected to the negative electrode 302 of the solar cell panel 300 and the second conductor 102 is electrically connected to a positive electrode 301 of the solar cell panel 300 so that the diode 103 is electrically connected with the solar cell panel 300 in a parallel connection manner and functions as a by-pass diode for the solar cell panel 300.

Further referring to FIGS. 1-3, in the by-pass diode connection mode, the conductor piece 201 of the second junction box 200 is electrically connected to the negative electrode 302 of the solar cell panel 300.

Please refer to FIGS. 1-3, the other end of the first cable 104 of the first junction box 100 of the solar cell panel 300 may be electrically connected to a cable of one of a first and second junction boxes of another solar cell panel (not shown), and the other end of the second cable 204 of the second junction box 200 of the solar cell panel 300 may be electrically connected to a cable of the other of the first and second junction boxes of the another solar cell panel. In this way, two solar cell panels may be electrically connected in the by-pass protection mode.

But the invention is not limited to this. Rather, three or more solar cell panels may be electrically connected in the by-pass protection mode by the solar cell connection module of the invention, for example, the other end of the first cable 104 of the first junction box 100 of the first solar cell panel 300 may be electrically connected to a cable of a second junction box of a second solar cell panel (not shown), and the other end of the second cable 204 of the second junction box 200 of the first solar cell panel 300 may be electrically connected to a cable of a first junction box of a third solar cell panel (not shown).

As shown in FIG. 3, the other end of the first cable 104 of the first junction box 100 of the solar cell panel 300 has a first connector 110 for electrically connecting with a mating connector of a cable of a second junction box of another solar cell panel, and the other end of the second cable 204 of the second junction box 200 of the solar cell panel 300 has a second connector 210 for electrically connecting with a mating connector of a cable of a first junction box of the another solar cell panel or a yet another solar cell panel. In this way, a plurality of solar cell panels may be quickly interconnected in the by-pass protection mode by the solar cell connection module of the invention.

In an exemplary embodiment of the invention, the solar cell panel 300 may be a thin film solar cell panel or a silicon solar cell panel.

Figure 4:
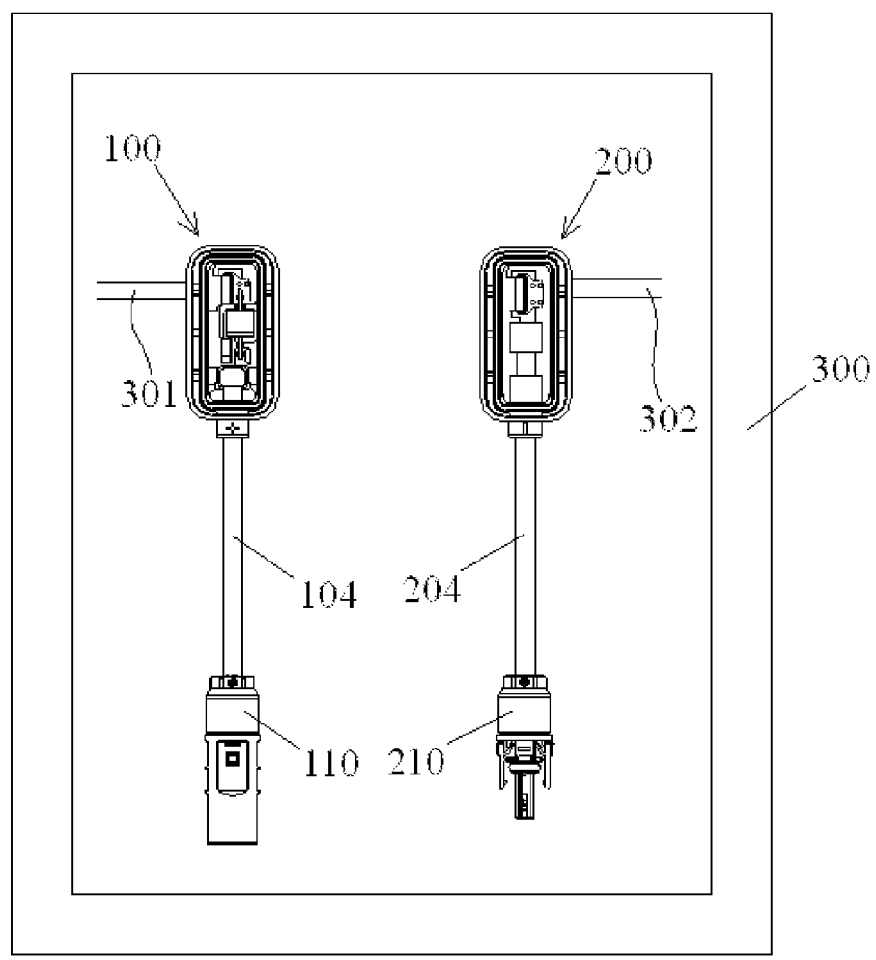
FIG. 4 is a plan view showing the first junction box of FIG. 1 and the second junction box of FIG. 2 connected with a solar cell panel in a interrupting protection mode.

With reference to FIG. 4, the first junction box 100 of FIG. 1 and the second junction box 200 of FIG. 2 are connected with a solar cell panel 300 in an interrupting protection mode.

As shown in FIGS. 1, 2 and 4, the first conductor 101 of the first junction box 100 is electrically connected to the positive electrode 301 of the solar cell panel 300 and the second conductor 102 is not electrically connected to the solar cell panel 300 so that the diode 103 is electrically connected with the solar cell panel 300 in a series connection configuration and functions as an interrupting diode.

Further referring to FIGS. 1, 2 and 4, the conductor piece 201 of the second junction box 200 is electrically connected to the negative electrode 302 of the solar cell panel 300, such that interrupting diode connection mode, such that the series connection configuration functions as an interrupting diode.

With reference to FIGS. 1, 2 and 4, the other end of the first cable 104 of the first junction box 100 of the solar cell panel 300 may be electrically connected to a cable of one of a first and second junction boxes of another solar cell panel (not shown). The other end of the second cable 204 of the second junction box 200 of the solar cell panel 300 may be electrically connected to a cable of the other of the first and second junction boxes of the another solar cell panel. In this way, two solar cell panels 300 may be electrically connected in the interrupting protection mode.

But the invention is not limited to this, three or more solar cell panels may be electrically connected in the interrupting protection mode by the solar cell connection module of the invention, for example, the other end of the first cable 104 of the first junction box 100 of the first solar cell panel 300 may be electrically connected to a cable of a second junction box of a second solar cell panel (not shown). The other end of the second cable 204 of the second junction box 200 of the first solar cell panel 300 may be electrically connected to a cable of a first junction box of a third solar cell panel (not shown).

As shown in FIG. 4, the other end of the first cable 104 of the first junction box 100 of the solar cell panel 300 has a first connector 110 for electrically connecting with a mating connector of a cable of a second junction box of another solar cell panel; and the other end of the second cable 204 of the second junction box 200 of the solar cell panel 300 has a second connector 210 for electrically connecting with a mating connector of a cable of a first junction box of the another solar cell panel or a yet another solar cell panel. In this way, a plurality of solar cell panels may be quickly interconnected in the interrupting protection mode by the solar cell connection module of the invention.

In an exemplary embodiment of the invention, the solar cell panel 300 may be a thin film solar cell panel or a silicon solar cell panel.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A solar cell connection module for a solar cell panel having a negative electrode and a positive electrode, the solar cell connection module comprising:
    a first junction box having a first conductor, a second conductor, a first cable electrically connected to the second conductor, and a diode electrically connected between the first and second conductors, the first conductor electrically connected to the negative electrode and the second conductor electrically connected to the positive electrode so that the diode is electrically connected in parallel with the solar cell panel; and
    a second junction box having a conductor piece electrically connected to the negative electrode and a second cable electrically connected to the conductor piece.

2. The solar cell connection module according to claim 1, wherein the first cable is fixed to the first junction box using a first overmolded member.

3. The solar cell connection module according to claim 2, wherein the second cable is fixed to the second junction box using a second overmolded member.

4. The solar cell connection module according to claim 1, further comprising a first gel filling chamber formed in the first junction box and receiving the first conductor, the second conductor and the diode.

5. The solar cell connection module according to claim 4, further comprising a first gel overflowing groove surrounding the first gel filling chamber.

6. The solar cell connection module according to claim 5, further comprising a second gel filling chamber formed in the second junction box and receiving the conductor piece is received.

7. The solar cell connection module according to claim 6, further comprising a second gel overflowing groove surrounding the second gel filling chamber.

8. The solar cell connection module according to claim 7, further comprising a first drainage groove surrounding a periphery of the first gel overflowing groove.

9. The solar cell connection module according to claim 8, further comprising a drainage port disposed along a lower portion of the first drainage groove.

10. The solar cell connection module according to claim 9, further comprising a second drainage groove surrounding a periphery of the second gel overflowing groove.

11. The solar cell connection module according to claim 10, further comprising a second drainage port disposed along a lower portion of the second drainage groove.

12. The solar cell connection module according to claim 1, wherein the first cable is electrically connected to one of a first and second junction boxes of another solar cell panel.

13. The solar cell connection module according to claim 12, wherein the second cable is electrically connected to the other of the first and second junction boxes of the other solar cell panel.

14. The solar cell connection module according to claim 1, wherein the solar cell panel is a thin film solar cell panel or a silicon solar cell panel.

15. A solar cell connection module for a solar cell panel having a negative electrode and a positive electrode, the solar cell connection module comprising:
 a first junction box having a first conductor, a second conductor, a first cable electrically connected to the second conductor, and a diode electrically connected between the first and second conductors, the first conductor electrically connected to the positive electrode such that the diode is electrically connected in series with the solar cell panel;
 a second junction box having a conductor piece electrically connected to the negative electrode and a second cable electrically connected to the conductor piece.

16. The solar cell connection module according to claim 15, wherein the first cable is fixed to the first junction box using a first overmolded member.

17. The solar cell connection module according to claim 16, wherein the second cable is fixed to the second junction box using a second overmolded member.

18. The solar cell connection module according to claim 15, further comprising a first gel filling chamber formed in the first junction box and receiving the first conductor, the second conductor and the diode.

19. The solar cell connection module according to claim 18, further comprising a first gel overflowing groove surrounding the first gel filling chamber.

20. The solar cell connection module according to claim 19, further comprising a second gel filling chamber formed in the second junction box and receiving the conductor piece.

21. The solar cell connection module according to claim 20, further comprising a second gel overflowing groove surrounding the second gel filling chamber.

22. The solar cell connection module according to claim 21, further comprising a first drainage groove surrounding a periphery of the first gel overflowing groove.

23. The solar cell connection module according to claim 22, further comprising a drainage port disposed along a lower portion of the first drainage groove.

24. The solar cell connection module according to claim 23, further comprising a second drainage groove surrounding a periphery of the second gel overflowing groove.

25. The solar cell connection module according to claim 24, further comprising a second drainage port disposed along a lower portion of the second drainage groove.

26. The solar cell connection module according to claim 15, wherein the first cable is electrically connected to one of a first and second junction boxes of another solar cell panel.

27. The solar cell connection module according to claim 26, wherein the second cable is electrically connected to the other of the first and second junction boxes of the another solar cell panel.

28. The solar cell connection module according to claim 15, wherein the solar cell panel is a thin film solar cell panel or a silicon solar cell panel.

* * * * *